United States Patent
Bergman

(10) Patent No.: US 9,830,895 B2
(45) Date of Patent: Nov. 28, 2017

(54) METHOD FOR OFFSETTING PITCH DATA IN AN AUDIO FILE

(71) Applicant: Berggram Development Oy, Helsinki (FI)

(72) Inventor: Jussi Bergman, Helsinki (FI)

(73) Assignee: Berggram Development Oy, Helsinki (FI)

( * ) Notice: Subject to any disclaimer, the term of this patent is extended or adjusted under 35 U.S.C. 154(b) by 0 days.

(21) Appl. No.: 15/121,063

(22) PCT Filed: Mar. 16, 2015

(86) PCT No.: PCT/FI2015/050168
§ 371 (c)(1),
(2) Date: Aug. 24, 2016

(87) PCT Pub. No.: WO2015/136159
PCT Pub. Date: Sep. 17, 2015

(65) Prior Publication Data
US 2016/0365076 A1     Dec. 15, 2016

(30) Foreign Application Priority Data
Mar. 14, 2014 (FI) ...................................... 20145238

(51) Int. Cl.
   *G10H 1/38*        (2006.01)
   *G11B 27/034*     (2006.01)
   (Continued)

(52) U.S. Cl.
   CPC ................. *G10H 1/38* (2013.01); *G10G 1/00* (2013.01); *G10H 1/0008* (2013.01);
   (Continued)

(58) Field of Classification Search
   CPC .......... G10H 1/38; G10H 1/00; G10H 1/0008; G10H 2210/056
   (Continued)

(56) References Cited

U.S. PATENT DOCUMENTS

| | | | |
|---|---|---|---|
| 5,099,738 A | | 3/1992 | Hotz |
| 5,278,348 A | * | 1/1994 | Eitaki ....................... G10H 1/38 84/610 |

(Continued)

FOREIGN PATENT DOCUMENTS

WO     97/29480     8/1997

OTHER PUBLICATIONS

Logic Express 9 User Manual; 2009, viewed online on Feb. 3, 2017 at https://documentation.apple.com/en/logicexpress/usermanual/Logic%20Express%209%20User%20Manual%20(en).pdf.*

*Primary Examiner* — David Warren
(74) *Attorney, Agent, or Firm* — BelayIP Oy

(57) ABSTRACT

A method is provided of aligning pitch data with audio data in a computing device, the method comprising the computer implemented steps of compiling a plurality of pitch data related to an audio file, each pitch data including information about at least one distinct pitch which is capable of being used by an electronic device to emulate said pitch, said plurality of pitch data compiled in a chronological order relating to said audio file, and arranging the compiled pitch data with the corresponding audio file containing audio data having at least one chord change, wherein the pitch data is offset from the audio data by a predetermined time margin. Further, an audio file is provided, stored on a non-transitory computer readable medium, having pitch data corresponding to and offset from chord changes in audio data by a predetermined time margin advance, and a non-transitory com- (Continued)

puter readable medium is provided, having stored thereon a set of computer executable instructions.

20 Claims, 1 Drawing Sheet

(51) Int. Cl.
 G11B 27/10 (2006.01)
 G10G 1/00 (2006.01)
 G10H 1/00 (2006.01)
(52) U.S. Cl.
 CPC ............ *G11B 27/034* (2013.01); *G11B 27/10* (2013.01); *G10H 2210/056* (2013.01); *G10H 2220/015* (2013.01); *G10H 2240/325* (2013.01)
(58) Field of Classification Search
 USPC .......................................................... 84/613
 See application file for complete search history.

(56) References Cited

U.S. PATENT DOCUMENTS

| | | | | | |
|---|---|---|---|---|---|
| 5,521,324 | A | * | 5/1996 | Dannenberg | G10H 1/0058 84/612 |
| 5,585,585 | A | * | 12/1996 | Paulson | G10H 1/361 84/610 |
| 2002/0134224 | A1 | * | 9/2002 | Umezawa | G09B 15/002 89/1.1 |
| 2006/0191399 | A1 | * | 8/2006 | Miyaki | G09B 5/06 84/613 |
| 2014/0310011 | A1 | * | 10/2014 | Biswas | G10L 25/54 704/500 |
| 2015/0096433 | A1 | * | 4/2015 | Watanabe | G10H 1/383 84/613 |
| 2015/0331659 | A1 | * | 11/2015 | Park | G10H 1/0083 700/94 |
| 2016/0365076 | A1 | * | 12/2016 | Bergman | G11B 27/034 |

* cited by examiner

METHOD FOR OFFSETTING PITCH DATA IN AN AUDIO FILE

FIELD OF INVENTION

The present invention relates to a method of offsetting pitch data pertaining to audio data in an audio file.

BACKGROUND OF THE INVENTION

Audio files typically contain audio data, e.g. music, in some format which can be utilized by an electronic device to play the audio data. Audio files may be raw data or an encoded format of the raw data. A non-extensive list of examples is: WAV, AIFF, AU, Apple lossless, MPEG-4 SLS, WMA or MP3. Additionally, audio data and/or audio files can be combined with video data and/or video files.

It has become popular to add non-audio data to audio files. Some examples are song names, album names, album cover art, links, and other bibliographic information. In addition, some audio files include data which is representative of the chords being played in music in the audio file. Typically this chord data is in the format which can be simply displayed to a user so that they can visually see the chord being played at that time and then use that information as they see fit.

However, when chord data is included with audio data in audio files the chord data typically directly correlates to a chord in the audio file and is therefore associated with the timing of the chord in question. When non-audio data is merely being displayed in connection with the audio file then the associated timing of the display of the information can be that time at which the user should see the information. Audio data can refer to just soundtracks or to the audio or combined audio/visual data of a digital video as well.

When data, such as chord data, is actually intended to be used in connection with the audio data then there exists a need to modify the timing of the presentation of the non-audio data with relation to the intended point of use within the audio file in order for the data to achieve it's optimal usage.

SUMMARY OF THE INVENTION

An object of the present invention is to provide a method of offsetting pitch data with audio data in a computing device.

Another object of the invention is to provide an audio file stored on a non-transitory computer readable medium having pitch data corresponding to and offset from chord changes in the audio data by a predetermined time margin.

It is an aspect of certain embodiments of the present invention to provide a method of aligning pitch data with audio data in a computing device. Such methods comprise the computer implemented steps of:
 compiling a plurality of pitch data related to an audio file, each pitch data including information about at least one distinct pitch which is capable of being used by an electronic device to emulate said pitch, said plurality of pitch data compiled in a chronological order relating to said audio file, and
 arranging the compiled pitch data with the corresponding audio file containing audio data having at least one chord change, wherein the pitch data is offset from the audio data by a predetermined time margin.

According to certain examples of the present invention each pitch data includes timing data. Each pitch data may comprise a plurality of pitches for a single time. Each pitch data may further comprise chord data which is capable of being used by an electronic device to play a plurality of pitches in the defined chord.

In another example the chord data includes a plurality of individual pitches which is less than a full chord. The plurality of pitch data may be compiled with timing data, wherein the timing data indicates the timing between changing pitch datas.

The plurality of pitch data may be derived from the audio data.

According to a further example the compiled pitch data includes the plurality of individual pitch data separated by time intervals, wherein the time intervals correspond to time intervals between chord changes in the audio data.

The electronic device may be a computing device, an electronic keyboard, a midi guitar or any other electronically controlled musical instrument.

The offset of the pitch data from corresponding chord changes in the audio data is an advance of between 150-400 ms, preferably between 200-350 ms, more preferably 300 ms.

The pitch data may be alphanumeric chord data indicative of a predefined chord.

Arranging the compiled pitch data with the corresponding audio file according to an example of the invention includes incorporating the compiled pitch data with the audio data into the audio file. Arranging the compiled pitch data with the corresponding audio file may further include combining the compiled pitch data and corresponding audio file into a new computer readable format. The audio file is associated with or a part of a video file.

The aforementioned method of aligning pitch data with audio data in a computing device according to the present invention may furthermore comprise identifying chord changes of the audio data in the audio file and the time of the chord changes within the audio file, creating pitch data corresponding to at least each identified chord change, wherein each created pitch data is offset from its corresponding chord change in the audio file by the predetermined time margin.

In accordance with certain embodiments, pitch data can be aligned with audio data in a computing device by compiling a plurality of pitch data related to an audio file, each pitch data including information about at least one distinct pitch which is capable of being used by an electronic device to emulate said pitch, said plurality of pitch data compiled in a chronological order relating to said audio file, and arranging the compiled pitch data with the corresponding audio file containing audio data having at least one chord change, wherein the pitch data is offset from the audio data by a predetermined time margin. The offset of the pitch data from corresponding chord changes in the audio data is an advance of between 150-400 ms, preferably between 200-350 ms, and even more preferably about 300 ms. Offsetting of the pitch data from corresponding chord changes in the audio data can take place for any chord and any number of chords along a time axis of the audio data.

When utilizing pitch data, particularly with regards to allowing a user to emulate sounds along with an associated audio file based on the pitch data, merely associating the pitch data with the relevant portion of the audio file results in awkward moments to a listener during chord changes. For example, many times in music prior to a chord change the musician or composer will begin using notes from the new chord before the chord actually changes in the music. This can be used to create suspense or to prepare the listener for the impending change, along with other uses.

When a user is playing along, particularly when improvising, if the player knows that a chord change is impending then they can likewise begin to modify their note selections to notes outside of the old chord and most often within the new impending chord before the change. However, when the player does not have full control over their note selection, e.g. when the notes available to the player are defined by the current chord and are not freely selectable from all possible notes on a keyboard, then the player loses additional control during these transitions.

Therefore, through offsetting pitch data associated with an audio file such that the pitch data for an impending chord change is available at a time prior to the chord change itself then the player is not only allowed, but essentially forced to play in the new key early which not only avoids awkward play but also promotes more interesting play. For example, without the present invention, if the pitch data is not offset then if a composer of an audio file selects a note in the new key prior to a chord change and the improviser chooses at the same time to play a variant of that note, e.g. the composer selects $b^\#$ and the player selects b then an awkward sound to the listener results.

With the aid of the present invention even an uneducated person can accompany any music performance at home, in a studio or on stage. The sounds are smoothed in real-time when aligning the pitch data with the audio data. Along the time axis of the audio data the desired pitch is always obtained increasing harmony of an audio output signal consisting of audio input data and harmonic accompaniment.

BRIEF DESCRIPTION OF THE DRAWINGS

For a more complete understanding of particular embodiments of the present invention and their advantages, reference is now made to the following descriptions, taken in conjunction with the accompanying drawings. In the drawings.

DETAILED DESCRIPTION OF EXEMPLARY EMBODIMENTS

Audio files are well known in the art. Audio files may be purely audio or they may be a portion of a video file as well. Audio files herein refer to both stand alone audio files, e.g. songs, and video files with an audio file component, e.g. music videos. Additionally, audio files as referred to herein may contain additional non-audio related information.

Audio files are characterized in that they are capable of being used by a computing device with a speaker arrangement to produce sound. Embodiments of the present invention are primarily concerned with the produced sound being that of a song. According to such embodiments, the song is composed of a plurality of notes in at least one chord. Within the present disclosure, chord and key are used synonymously when discussing musicality. Furthermore, the majority of songs are composed of at least two chords which then inherently have at least one chord change between the chords.

As digital music progresses, most digital audio files comprise a plurality of non-audio data, i.e. data which is not imperative to the intended creation of sound. This non-audio data can be related to the artist, user rights, copy rights, album information, biographical information, etc. This information is typically located in a header or at a specific portion of the audio file, e.g. the beginning.

However, there can also be additional information which is included throughout the audio file. Such information can be, for example, pitch data. Pitch data is herein defined as any data which relates to a pitch, note, chord, key or other pitch related musical information. Pitch data can be, for example, data relating to the chord of the music. Because the chord of a song typically changes at discrete intervals throughout a song, there is typically multiple bits of pitch data throughout an audio file which correspond to relevant pitches at a given time. For example, as soon as a chord changes in a song there can be at that time in the audio file an indication of either the change and/or the new chord. This information can be in computer readable form and/or displayable text. For example, the chord information could be alphanumeric and simply displayed along with a visual track of the audio file so that a user could read the current chord of the song while the audio file was being played.

Figure 1:
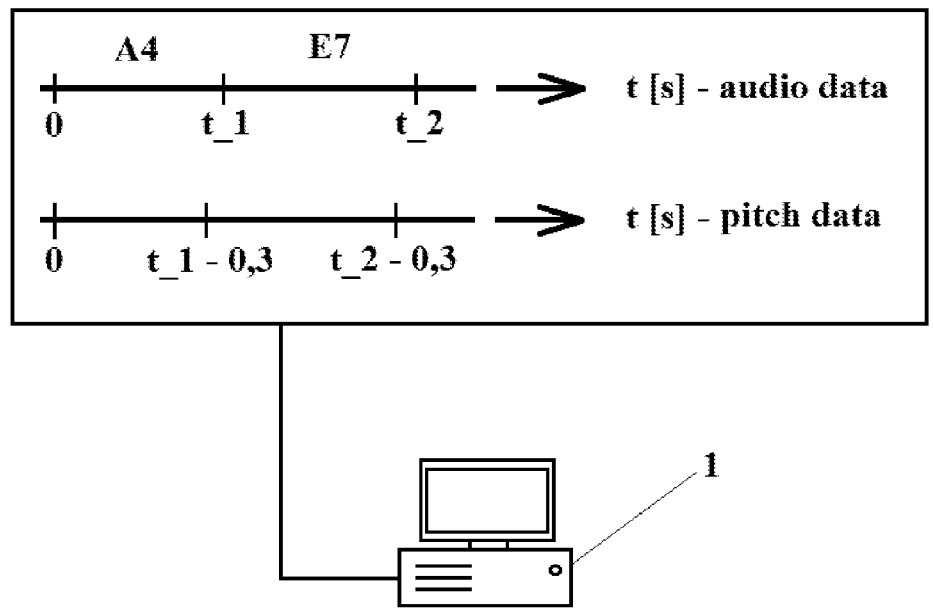
FIG. 1 illustrates a schematic view of a time axis of an audio data signal and pitch data according to a first embodiment of the present invention.

In FIG. 1 a schematic view of a time axis of audio data and pitch data according to a first embodiment of the present invention is shown. The pitch data is aligned with audio data and present, in the present example, in a computing device 1. The top line of FIG. 1 can be seen as the basic audio information in an audio file. At time 0 the song begins and the song begins in chord A4. At time t_1 the chord of the song changes to E7 which lasts until time t_2.

The second line of FIG. 1 shows a schematic example of pitch data according to the present invention. While the chord changes between A4 and E7 in the audio file at time t_1, according to the present invention the pitch data is offset from that change and is actually presented aligned at an offset of three tenths of a second before the actual change. Similarly, before the change between chord E7 and the subsequent chord in the audio file, e.g. at time t_2 minus three tenths of a second the relevant pitch data of the new pitch is aligned with the audio data.

The computing device 1 for aligning the pitch data with the audio data may be for example a personal computer, a mobile phone, a tablet computer or any other electronic computing device. The electronic device 2 for accompanying the audio signal of the audio file in real time may be, e.g. a computing device 1, an electronic keyboard, a midi guitar or any other electronically controlled musical instrument.

According to FIG. 1 the pitch data is offset from the chord change from chord A4 to chord E7 at the particular time t_1 in the audio data by a predetermined time margin advance of 300 ms. In other examples of the present invention the predetermined time margin may be any value in the range between 150-400 ms or preferably between 200-350 ms.

Figure 2:
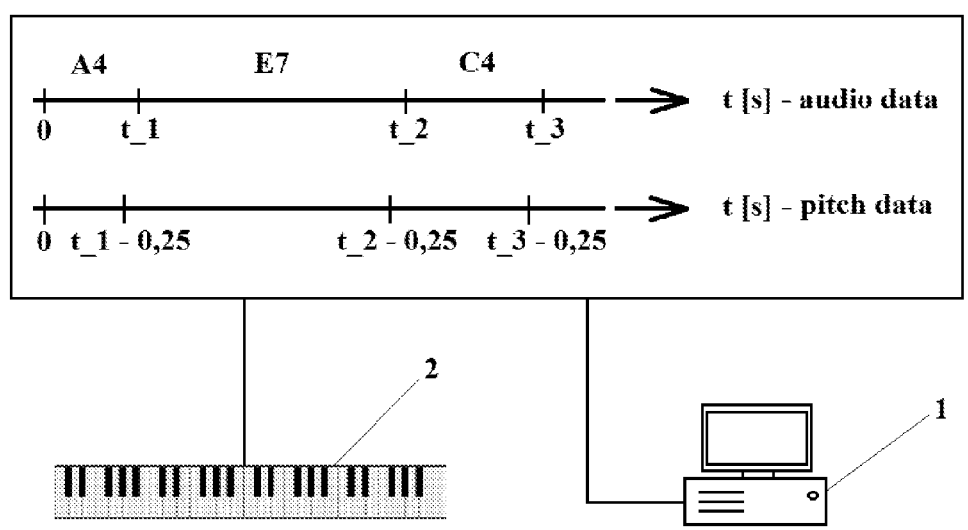
FIG. 2 illustrates a schematic view of a time axis of an audio data signal and pitch data according to a second embodiment of the present invention.

In FIG. 2 a schematic view of a time axis of an audio data signal and pitch data according to a second example of the present invention is shown. The computing device 1 according to the second embodiment of the invention is a personal computer and the electronic device 2 is an electronic keyboard.

The pitch data is offset from the chord changes from A4 to E7 and from E7 to C4 at the particular times t_1 and t_2 in the audio data by a predetermined time margin advance of 250 ms. Each pitch data may include timing data. Additionally, each pitch data may comprise a plurality of pitches for a single time. The pitch data may comprise chord data which is capable of being used by an electronic device 2 to play a plurality of pitches in the defined chord. The chord data may include a plurality of individual pitches which is less than a full chord.

The plurality of pitch data includes and/or is compiled with and/or with the use timing data. Timing data can indicate the timing between changing pitch data, the absolute timing at which pitch data changes, the timing between changing chords in the audio data, the absolute timing at which chords in the audio data change or a combination thereof.

The plurality of pitch data can be derived from the audio data. The compiled pitch data can include a plurality of individual pitch bites separated by time intervals. For example, the time intervals can correspond to time intervals $[0, t\_1]$, $[t\_1, t\_2]$ and $[t\_2, t\_3]$ between chord changes from A4 to E7 and from E7 to C4 in the audio data. The time intervals $[0, t\_1]$, $[t\_1, t\_2]$ and $[t\_2, t\_3]$ of the chords A4, E7 and C4 in the audio data, i.e. the duration of a single chord, can be of any time. The pitch data can be alphanumeric chord data indicative of a predefined chord, for example C, C#, D, Eb, E, F, F#, G, Ab, A, Bb, B, C7, C#7, D7, Eb7, E7, F7, F#7, G7, Ab7, A7, Bb7, B7, Cm, C#m, Dm, Ebm, Em, Fm, F#m, Gm, Abm, Am, Bbm, Bm, Cm7, C#m7, Dm7, Ebm7, Em7, Fm7, F#m7, Gm7, Abm7, Am7, Bbm7, Bm7, C+, C#+, D+, Eb+, E+, F+, F#+, G+, Ab+, A+, Bb+, B+, Cdim, C#dim, Ddim, Ebdim, Edim, Fdim, F#dim, Gdim, Abdim, Adim, Bbdim, Bdim or any other chord.

Arranging the compiled pitch data with the corresponding audio file can include incorporating the compiled pitch data with the audio data into an audio file. Additionally, the arranging the compiled pitch data can include creating a pitch data file and syncing information in which the pitch data file can be synced with an associated audio file and executed together on the same electronic device. Furthermore, arranging the compiled pitch data with the corresponding audio file may further include combining the compiled pitch data and corresponding audio file into a new computer readable format. The audio file may further be associated with or a part of a video file, for example a video file of a musical performance or a music video.

The pitch data within, or synced with the audio file can then be used with an electronic device to emulate sounds based on the pitch data. For example, an electronic keyboard can be connected to a computer. The computer can play an audio file with audio data and pitch data. A program within the computer can then utilize the pitch data to control the discrete notes on the keyboard which can be played at a given time. An example of this is given by the entirely of U.S. application Ser. No. 13/739,023 filed Jan. 11, 2013 and incorporated in its entirety by reference herein. Thus a user can play along with a song on the keyboard and only play discrete notes, based on the pitch data. Ideally the allowed discrete notes are selected to sound good to an audience, e.g. the player, based on the pitch data. According to the present invention, when a person is playing the keyboard in this manner and a chord change in the music is impending, the pitch data associated with the new chord will come at a predetermined time period offset from the actual change in the music such that the user will change the notes that they are playing to correspond to the new chord at a time different from the actual change within the music. This at least increases the musicality and usability of such emulation and play along systems.

According to certain embodiments, the pitch data is representative of a musical chord. For example, the pitch data can be c, e & g in a certain register which is representative of the c major chord in that register. According to such embodiments, the pitch data is not necessarily indicative of pitches to be played, but of playable pitches. For example, for pitch data c, e & g in a specific register at a given time, not all of the notes may be played by a user but the user may be able to play any of those pitches or combination of those pitches at said time.

Additionally, while pitch data may include a specific note in a specific register, based on the pitch data, the system may allow the user to play the specific notes in the pitch data in one or more registers, higher and/or lower than the specific register identified in the pitch data.

According to certain embodiments, other types of data can be used along with or in place of pitch data. For example, note data and/or chord data can be used. Any of such data types, along or in combination, can be used in accordance with the embodiments and examples described above.

For example, note data can be which can only include generic notes, e.g. c, e & g. Compared to pitch data, note data may not have an indication of an associated register for the notes. In such examples, if a plurality of note data consisted of c, e & g then, based on the note data, the system may allow a user to be able to play c, e, g or a combination thereof, each in one or more registers.

Additionally, according to certain embodiments, a system may ignore register information of pitch data. According to certain examples, even when pitch data includes a specific pitch, a system would allow a user to be able to play the underlying generic note in at least one other register than which is included in the specific pitch data. The other register(s) may be higher and/or lower than the indicated register of the pitch data.

In examples and embodiments where only a few select notes or pitches which are representative of a chord are contained in the pitch and/or note data, the system may allow a user to not only play the indicated notes or pitches but also an additional note(s) or pitch(s) within the representative chord.

Similarly, in place of or along with pitch data and/or note data, chord data can be used. Chord data can indicate, for example, a chord such as C major or B minor. Chord data can include register information or not. Chord data may also include a number of notes or specific notes within the chord which can be player. A system using the chord data may also allow a user to play a specific number of notes within the indicated chord and/or specific notes within the chord based on the chord data and one or more formulas or charts indicating allowed notes and/or pitches within the chord, based on the chord, and/or based on additional information, such as earlier and/or future chord data, pitch data and/or note data.

As described here, musical data is used as a generic term which can include pitch data, note data, chord data or a combination thereof.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

LIST OF REFERENCE NUMBERS 1 computing device
2 electronic device
A4 chord
E7 chord
C4 chord
t time [s]

The invention claimed is:

1. A method of aligning musical data with audio data in a computing device, the method comprising the computer implemented steps of;
   identifying chord changes of the audio data in the audio file and the time of the chord changes within the audio file,
   creating musical data corresponding to at least each identified chord change,
   compiling the musical data related to an audio file, each musical data including information about at least one distinct note which is capable of being used by an electronic device to emulate a pitch based on said note, said plurality of musical data compiled in a chronological order relating to said audio file,
   arranging the compiled musical data with the corresponding audio file containing audio data having at least one chord change, wherein the musical data is offset from the audio data by a predetermined time margin.

2. A method according to claim 1, wherein each musical data includes timing data.

3. A method according to claim 1, wherein the musical data is pitch data, note data or chord data.

4. A method according to claim 1, wherein the musical data comprises a plurality of pitches and/or notes for a single time.

5. A method according to claim 1, wherein each musical data is representative of a chord which is capable of being used by an electronic device to play a plurality of pitches in the representative chord.

6. A method according to claim 5, wherein the musical data includes a plurality of individual notes and/or pitches which is less than a full chord.

7. A method according to claim 1, wherein the plurality of musical data is compiled with timing data, and wherein the timing data indicates the timing between changing of musical data.

8. A method according to claim 1, wherein the plurality of musical data is derived from the audio data automatically using pitch detection software on at least a portion of the audio data and/or manually entered.

9. A method according to claim 1, wherein the compiled musical data includes a plurality of individual musical data separated by time intervals, wherein the time intervals correspond to time intervals between chord changes in the audio data.

10. A method according to claim 1, wherein the electronic device is a computing device, electronic keyboard, midi guitar or other electronically controlled musical instrument.

11. A method according to claim 1, wherein the offset of the musical data from corresponding chord changes in the audio data is an advance of between 150-400 ms.

12. A method according to claim 1, wherein the musical data is chord data including alphanumeric data indicative of a predefined chord.

13. A method according to claim 1, wherein arranging the compiled musical data with the corresponding audio file includes incorporating the compiled musical data with the audio data into the audio file.

14. A method according to claim 1, wherein arranging the compiled musical data with the corresponding audio file includes combining the compiled musical data and corresponding audio file into a new computer readable format.

15. A method according to claim 1, wherein the audio file is associated with or a part of a video file.

16. An audio file stored on a non-transitory computer readable medium having musical data corresponding to and offset from chord changes in audio data by a predetermined time margin advance of 200-350 ms.

17. A non-transitory computer readable medium having stored thereon a set of computer executable instructions for causing a computing device to carry out the computer implemented steps of:
   identifying chord changes of the audio data in the audio file and the time of the chord changes within the audio file,
   creating musical data corresponding to at least each identified chord change,
   compiling of the musical data related to an audio file, each musical data including information about at least one distinct note which is capable of being used by an electronic device to emulate a pitch based on said note, said plurality of musical data compiled in a chronological order relating to said audio file, arranging the compiled musical data with the corresponding audio file containing audio data having at least one chord change, wherein the musical data is offset from the audio data by a predetermined time margin.

18. The non-transitory computer readable medium of claim 17, wherein the offset of the musical data from corresponding chord changes in the audio data is an advance of between 150-400 ms.

19. The non-transitory computer readable medium of claim 17, wherein musical data is representative of a chord which is capable of being used by an electronic device to play a plurality of pitches in the representative chord.

20. The non-transitory computer readable medium of claim 17, wherein the plurality of musical data is derived from the audio data automatically using pitch detection software on at least a portion of the audio data and/or manually entered.

* * * * *